US007520129B2

(12) United States Patent
Springett

(10) Patent No.: US 7,520,129 B2
(45) Date of Patent: Apr. 21, 2009

(54) SUBSEA PRESSURE ACCUMULATOR SYSTEMS

(75) Inventor: Frank B. Springett, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 144 days.

(21) Appl. No.: 11/594,012

(22) Filed: Nov. 7, 2006

(65) Prior Publication Data

US 2008/0104951 A1 May 8, 2008

(51) Int. Cl.
*F16D 31/02* (2006.01)

(52) U.S. Cl. .......................................... 60/398; 60/413

(58) Field of Classification Search .................. 60/398, 60/413; 138/31

See application file for complete search history.

(56) References Cited

U.S. PATENT DOCUMENTS

| | | | |
|---|---|---|---|
| 2,193,736 A | 3/1940 | Onions | |
| 2,393,524 A | 1/1946 | Fant | |
| 2,554,381 A | 5/1951 | Patterson, Jr. | |
| 2,747,370 A * | 5/1956 | Traut | 138/31 |
| 3,436,914 A | 4/1969 | Rosfelder | |
| 3,653,635 A | 4/1972 | Bates, Jr. et al | |
| 3,669,151 A | 6/1972 | Fleming | |
| 3,677,001 A | 7/1972 | Childers et al | |
| 3,750,404 A | 8/1973 | Murman et al | 60/413 |
| 3,856,048 A | 12/1974 | Gratzmuller | |
| 3,912,227 A | 10/1975 | Meeker et al | |
| 3,918,498 A | 11/1975 | Schneider | |
| 3,987,708 A | 10/1976 | Uhrich | |
| 4,185,652 A | 1/1980 | Zintz et al. | |
| 4,187,682 A | 2/1980 | Shen | |
| 4,204,461 A | 5/1980 | Gratzmuller | |
| 4,205,594 A | 6/1980 | Burke | |
| 4,294,452 A | 10/1981 | Schlotter et al. | |
| 4,475,710 A | 10/1984 | Leupers | |
| 4,649,704 A | 3/1987 | Marsh | |
| 4,777,800 A | 10/1988 | Hay, II | |
| 6,192,680 B1 | 2/2001 | Brugman et al. | |
| 6,202,753 B1 | 3/2001 | Baugh | |
| 6,266,959 B1 | 7/2001 | Markwart | |
| 6,418,970 B1 | 7/2002 | Deul | |
| 7,108,006 B2 | 9/2006 | Armstrong | |
| 7,131,496 B2 | 11/2006 | Williams | |

FOREIGN PATENT DOCUMENTS

GB 2155105 A 2/1985

* cited by examiner

*Primary Examiner*—F. Daniel Lopez
(74) *Attorney, Agent, or Firm*—Guy McClung

(57) ABSTRACT

An accumulator system which, in certain aspects, has a body with three (or more) interior chambers, e.g. in one aspect first, second, and third chambers, the body having a first body end with a first opening, and a second body end with a second opening, an amount of operational power fluid in the first chamber, an amount of pressurized gas in the second chamber for moving a piston assembly for moving power fluid from the body to operate an apparatus, the piston assembly having a cavity within a piston end for containing additional pressurized gas for moving the piston assembly.

21 Claims, 12 Drawing Sheets

SUBSEA PRESSURE ACCUMULATOR SYSTEMS

BACKGROUND OF THE INVENTION

1. Field of the Invention

The present invention is directed to underwater accumulator systems which provide pressurized working fluid.

2. Description of Related Art

Deepwater accumulators provide pressurized working fluid for the control and operation of equipment, e.g. for blowout preventer operators; gate valves for the control of flow of oil or gas to the surface or to other subsea locations; hydraulically actuated connectors; and similar devices. The fluid to be pressurized is typically an oil based product or a water based product with added lubricity and corrosion protection, e.g., but not limited to hydraulic fluid.

Certain prior art accumulators are precharged with pressurized gas to a pressure at or slightly below an anticipated minimum pressure required to operate equipment. Fluid can be added to the accumulator, increasing the pressure of the pressurized gas and the fluid. The fluid introduced into the accumulator is stored at a pressure at least as high as the precharge pressure and is available for doing hydraulic work.

Such prior art accumulators include: a bladder type with a bladder to separate the gas from the fluid; a piston type having a piston sliding up and down a seal bore to separate the fluid from the gas; and a float type with a float providing a partial separation of the fluid from the gas and for closing a valve when the float approaches the bottom to prevent the escape of gas.

In one particular example, a prior art system has accumulators that provide typical 3000 psi working fluid to surface equipment has a 5000 psi working pressure and contain fluid which raises the precharge pressure from 3000 psi to 5000 psi The efficiency of accumulators is decreased in deepwater; e.g., 1000 feet of seawater the ambient pressure is approximately 465 psi and, for an accumulator to provide a 3000 psi differential at 1000 ft. depth, it is precharged to 3000 psi plus 455 psi, or 3465 psi At slightly over 4000 ft. water depth, the ambient pressure is almost 2000 psi, so the precharge is required to be 3000 psi plus 2000 psi, or 5000 psi, i.e., the precharge equals the working pressure of the accumulator. Any fluid introduced for storage causes the pressure to exceed the working pressure, rendering the accumulator non-functional.

In the deepwater use of accumulators the ambient temperature can decrease to about 35 degrees F. For an accumulator precharged to 5000 psi at a surface temperature of 80 degrees F., about 416 psi precharge is lost simply because the temperature was reduced to 35 degrees F. The rapid discharge of fluids from accumulators and the associated rapid expansion of the pressurizing gas causes a natural cooling of the gas so that an accumulator is quickly reduced in pressure from, e.g., 5000 psi to 3000 psi without heat coming into the accumulator (adiabatic), experiences a pressure drop to 2012 psi U.S. Pat. Nos. 7,108,006; 6,202,753; 4,777,800; 4,649,704; and 3,677,001 are illustrative of various prior art systems and are mentioned here not by way of limitation nor as exhaustive of the available prior art; and all said patents are incorporated fully herein for all purposes. FIG. 1 illustrates a system as disclosed in U.S. Pat. No. 3,677,001 which shows a submerged pipeline 10 on which is arranged a valve housing 11 which contains a valve member to open and close pipeline 10 to control the flow of fluid therethrough. A valve stem housing is mounted on valve housing 11. A valve stem 13 extends through the valve stem housing and connects to a piston 14 arranged in an actuator cylinder 15. Piston 14 has fixed power and exhaust strokes. The valve stem housing is provided with packing seals 17 which surround and seal off fluid flow around valve stem 13. A reduced internal diameter portion 20 of actuator cylinder 15 forms a cavity or chamber 21 and a seating shoulder 23. A mating shoulder 22 formed on piston 14 is adapted to engage shoulder 23. A static seal 24 which suitably may be an "O"-ring is arranged in a recess in shoulder 23 and seals off the space between shoulders 22 and 23 when piston 14 is at the end of its power stroke, as shown in the figure. A spring 25 is arranged in chamber 21 and functions to move piston 14 in its exhaust stroke. When the valve is fully open, piston 14 is at the end of its power stroke and when the valve is fully closed the piston is at the end of its exhaust stroke. When the valve (or other equipment) to be operated is located at a remote offshore location, a hydraulic power fluid reservoir 30 is provided with a floating piston 31, compensated by sea water pressure. A diaphragm could be substituted for piston 31 A conduit 34 supplies a pump 32 with hydraulic control fluid from reservoir 30. Pump 32 is operated by electrical power supplied from the water's surface through a conductor 33. An accumulator 35 is connected to pump 32 to the exhaust stroke end of actuator cylinder 15 by means of a conduit 40. The purpose of the accumulator is to provide a supply of power fluid available for immediate delivery to cylinder 15. A bypass conduit 41 connects conduit 40 to reservoir 30. A solenoid operated valve 45 controlled by electrical power supplied from the water's surface through a conductor 46 is connected into conduit 41. Another solenoid operated valve 47 supplied with operating power from the water's surface through a conduit 48 is arranged between accumulator 35 and the junction of conduits 40 and 41. An additional conduit 50 connects chamber 21 to reservoir 30.

There has long been a need, recognized by the present inventor, for an effective accumulator systems and pressure compensation systems for underwater and subsea use. There has long been a need, recognized by the present inventor, for such systems which increase the amount of available pressurized gas to enhance the operation of subsea working fluid systems.

BRIEF SUMMARY OF THE INVENTION

The present invention, in certain aspects, discloses a pressure accumulator system for subsea operations that with one or more containers or "bottles" which have a primary gas-containing chamber for containing gas under pressure and, additionally, a secondary chamber or cavity for containing such gas, the secondary chamber in fluid communication with the primary chamber so that the total effective gas volume is increased to the extent of the volume of the secondary chamber. In one aspect, the secondary chamber is a cavity in part of a piston assembly.

The present invention, in certain aspects, discloses an accumulator system for subwater use, such systems having a body (e.g. a housing); a fluid chamber within the body for containing power fluid; a piston assembly movably disposed within the body; a gas chamber within the body for containing gas under pressure to move the piston assembly to move the power fluid out of the fluid chamber of the body; the piston assembly including a cavity therein for containing gas under pressure for assisting in movement of the piston assembly; and the cavity in fluid communication with the gas chamber.

The present invention, in certain aspects, discloses accumulator systems for subwater use, the systems having a body (e.g. a housing); a piston assembly movably disposed within the body, the piston assembly having an interior; a rod member passing through the body and extending into the interior of the piston assembly; a rod member end on an end of the rod member, the rod member end disposed within the interior of the piston assembly, the rod member end having a first side and a second side; a power fluid chamber in the interior of the piston assembly, the power fluid chamber adjacent the first side of the rod member; a gas chamber in the interior of the piston assembly, the gas chamber adjacent the second side of the rod member; and the piston assembly movable by gas in the chamber to move power fluid out of the power fluid chamber.

The present invention, in certain aspects, discloses a pressure compensation system for subsea apparatus which has one or more hydraulic power units used in an hydraulic fluid system. In certain aspects, such subsea apparatus employs one or more hydraulic fluid reservoirs and/or accumulators which releasably hold operational amounts of hydraulic fluid at a pressure slightly greater than the pressure of water exterior to the reservoir for selectively operating subsea equipment and systems, e.g. BOP's, coiled tubing units, valves, and subsea wellhead connectors. The reservoir and/or accumulator(s) can require a substantial amount (e.g. 50, 100, 500 gallons or more) of hydraulic fluid which can entail the flow of this substantial amount of fluid from a reservoir to the accumulator(s). In certain systems according to the present invention, a "seawater boost" is provided which includes exposing a piston end to the pressure of the seawater. This piston effectively boosts the force provided by another piston which is acted upon by compressed gas to move a power fluid out of the system. By using the seawater boost effect, the required number of containers or bottles for compressed gas is reduced. The seawater boost can boost the pressure on contained hydraulic fluid in addition to the pressure of gas on the fluid, thus reducing the amount of pressurized gas required to achieve a certain pressure on the hydraulic fluid.

In certain aspects, the reservoir is initially charged at a pressure slightly higher than the pressure of the water to be encountered at depth and the reservoir is pressure compensated so that at depth it is not damaged or destroyed.

Accordingly, the present invention includes features and advantages which are believed to enable it to advance pressure accumulator system technology. Characteristics and advantages of the present invention described above and additional features and benefits will be readily apparent to those skilled in the art upon consideration of the following detailed description of preferred embodiments and referring to the accompanying drawings.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful, unique, efficient, non-obvious underwater power fluid systems and new, useful, unique, efficient, non-obvious accumulators for such power fluid systems;

Such systems for use with subsea blowout preventer operators; and

Such systems which can effectively provide significantly large volumes of power fluid.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL VIEWS OF THE DRAWING

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DETAILED DESCRIPTION OF THE INVENTION

Figure 1:
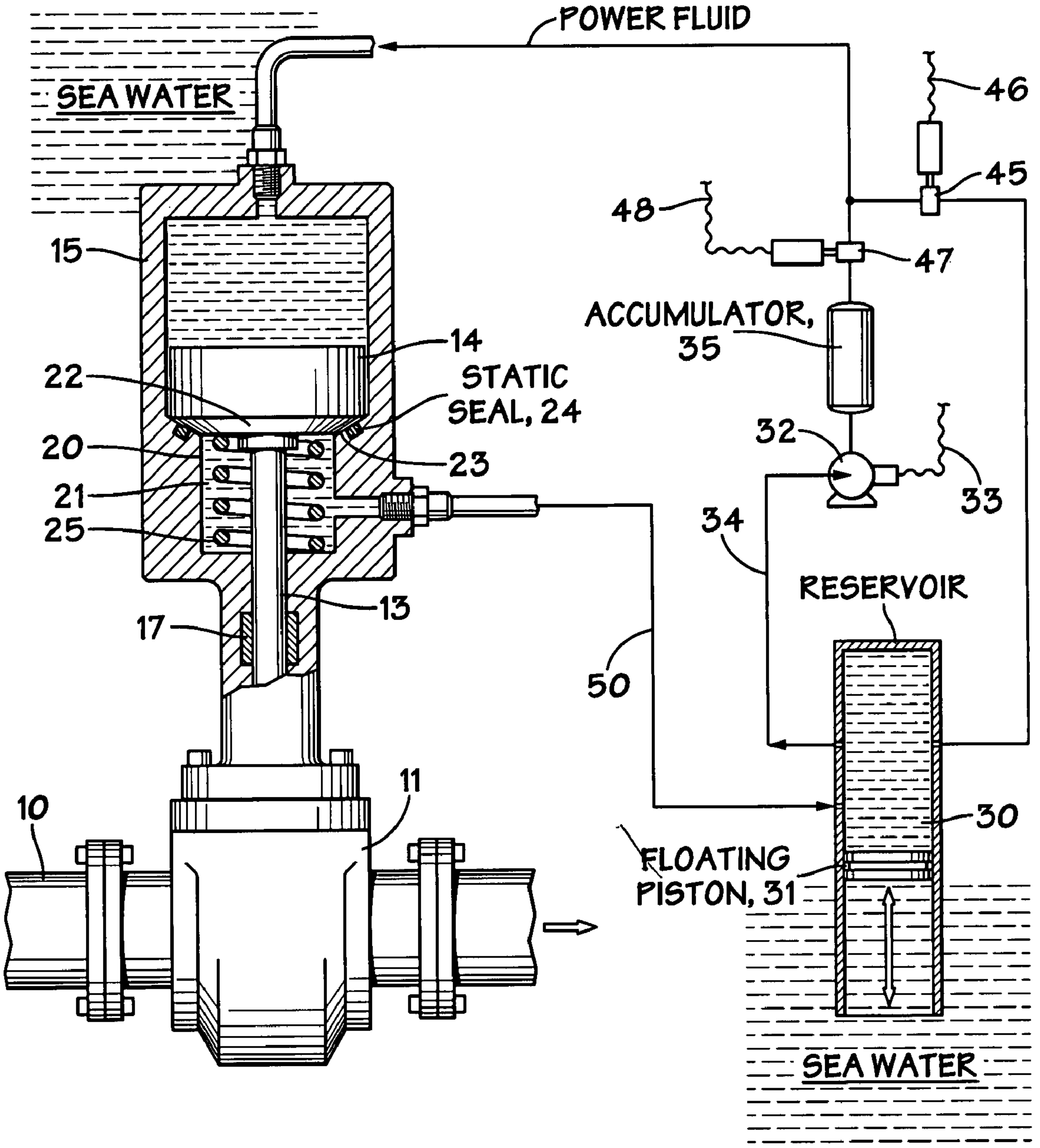
FIG. 1 (PRIOR ART)
FIG. 1 is a schematic view of a prior art pressure compensated reservoir.
Figure 2:
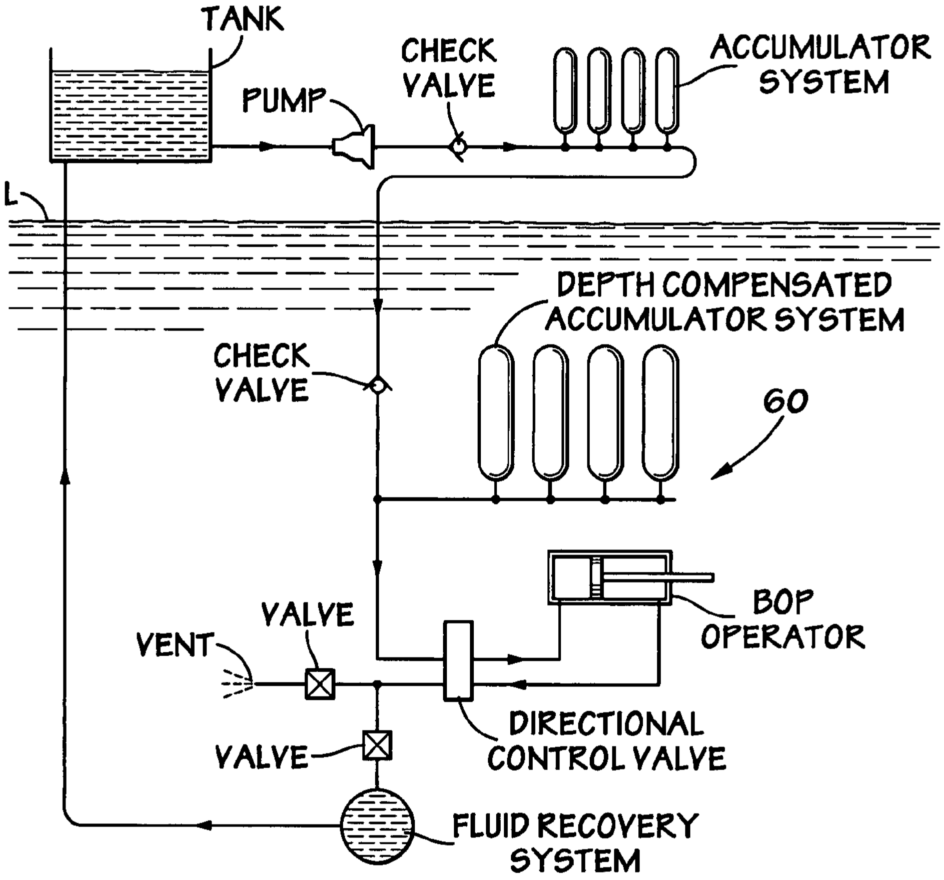
FIG. 2 is a schematic view of a system according to the present invention with accumulator containers according to the present invention.

FIG. 2 shows a system 60 according to the present invention in which power fluid from an hydraulic power unit is provided to a subsea blowout preventer operator ("BOP OPERATOR"). Hydraulic power fluid is pumped from a reservoir ("TANK") by a pump ("PUMP") through a check valve ("CHECK VALVE") to a bank of accumulator containers at the surface ("ACCUMULATOR SYSTEM"). This fluid is then provided beneath a water level L through a check valve ("CHECK VALVE") to an accumulator system according to the present invention with one or more depth compensated containers or bottles according to the present invention ("DEPTH COMPENSATED ACCUMULATOR SYSTEM"). A control valve ("DIRECTIONAL CONTROL VALVE") selectively provides the power fluid from the depth compensated accumulator containers to operate a subsea device or apparatus, e.g. the BOP operator shown. Fluid exhausted from the BOP operator either flows into the water ("VENT") or to a fluid recovery system ("FLUID RECOVERY SYSTEM") from which it returns to the surface fluid reservoir ("TANK"). The containers of the depth compensated accumulator system may be any container or bottle according to the present invention, including, but not limited to, those of FIGS. 5A-9B.

Figure 3:
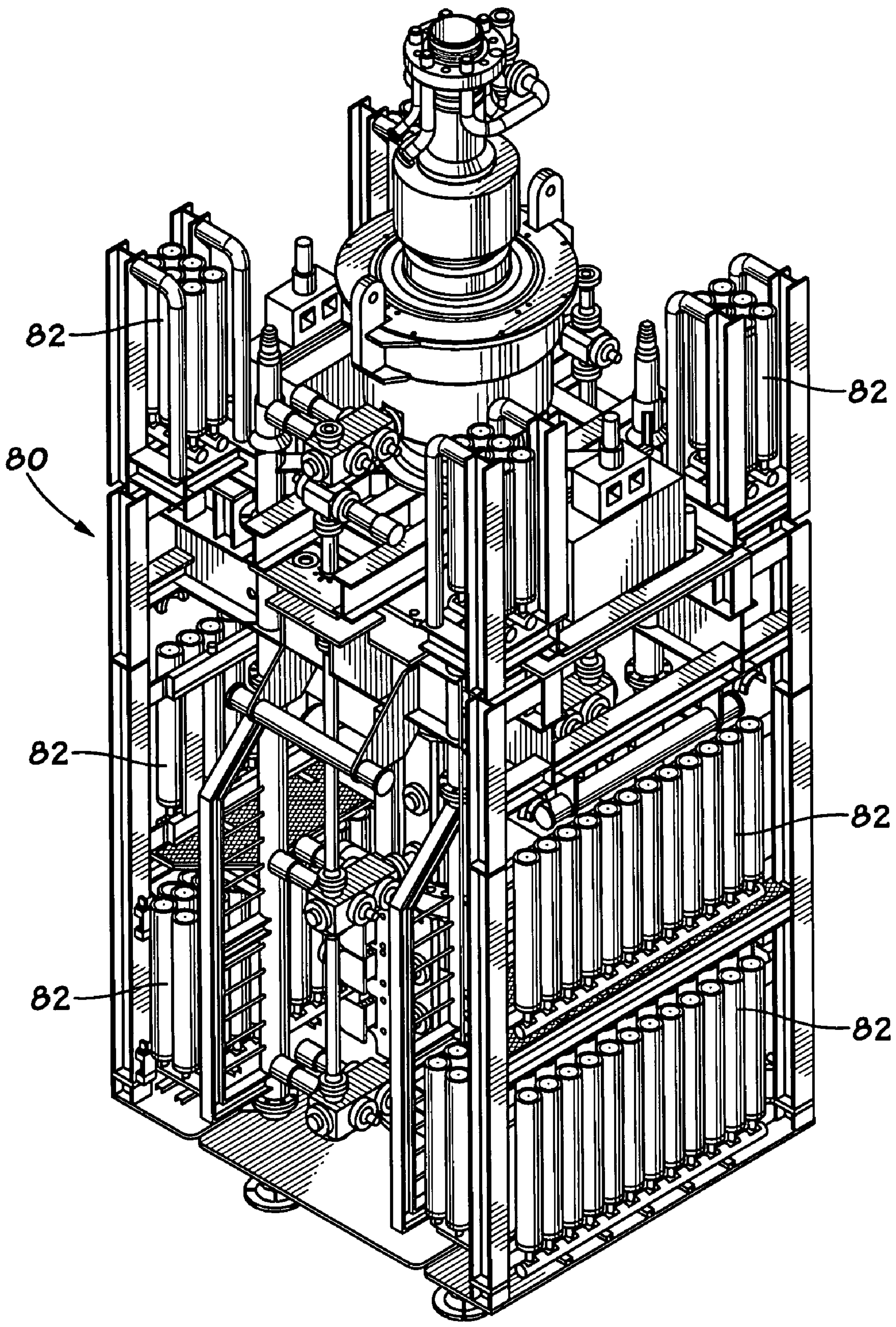
FIG. 3 is a perspective view of a subsea blowout preventer system according to the present invention with a subsea pressure accumulator system according to the present invention.

FIG. 3 shows a subsea blowout preventer system 80 according to the present invention with multiple accumulator systems 82 according to the present invention.

Figure 4:
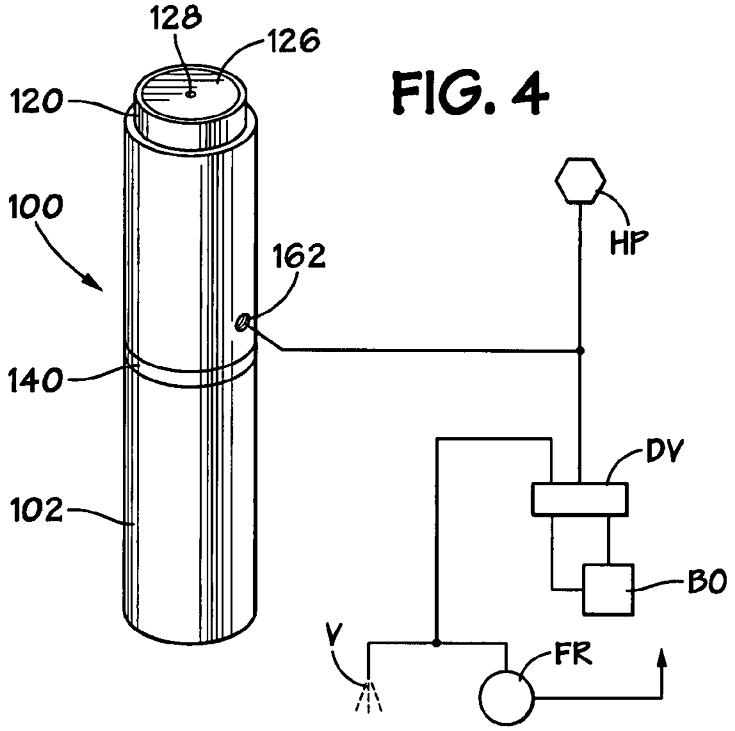
FIG. 4 is a schematic view of a system according to the present invention.
Figure 5A:
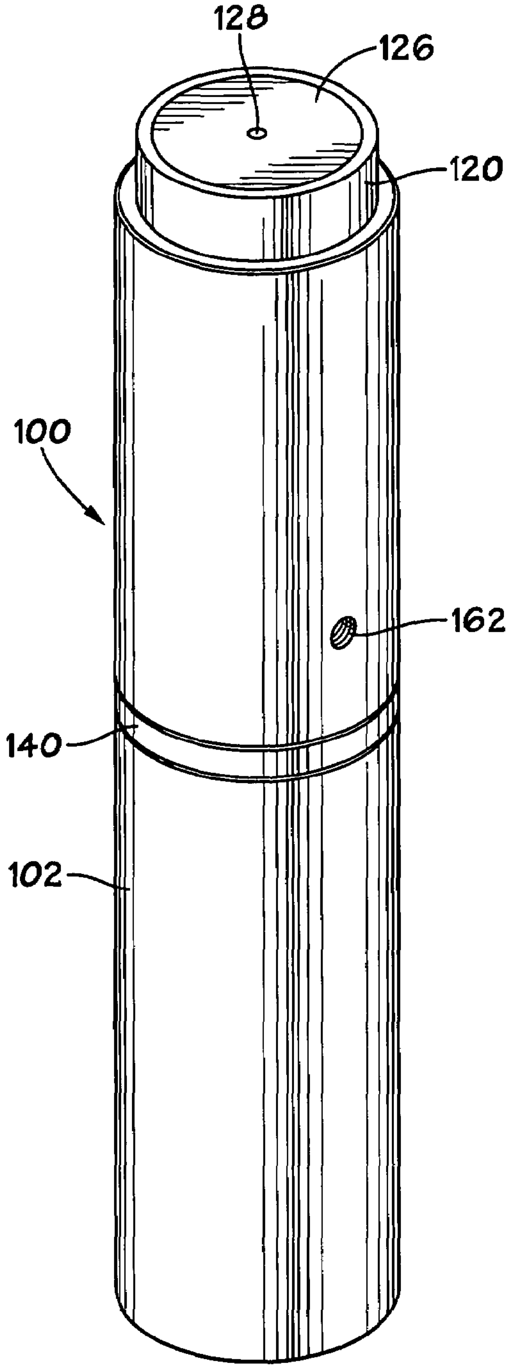
FIG. 5A is a perspective view of a pressure accumulator according to the present invention.
Figure 5B:
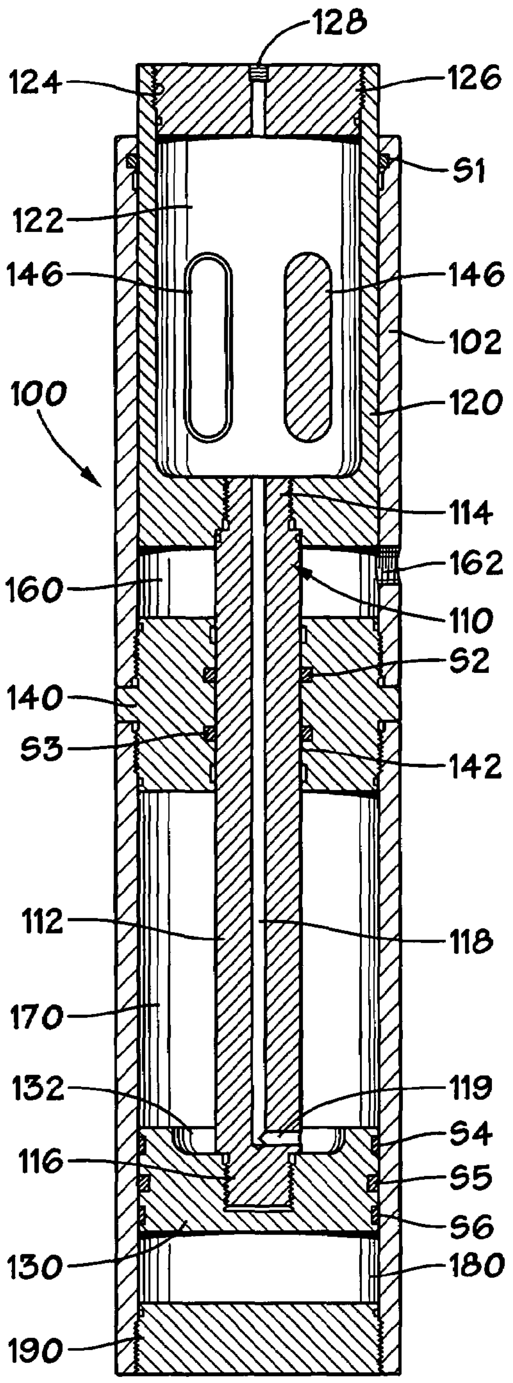
FIG. 5B is a cross-section view of the pressure accumulator of FIG. 5A.
Figure 5C:
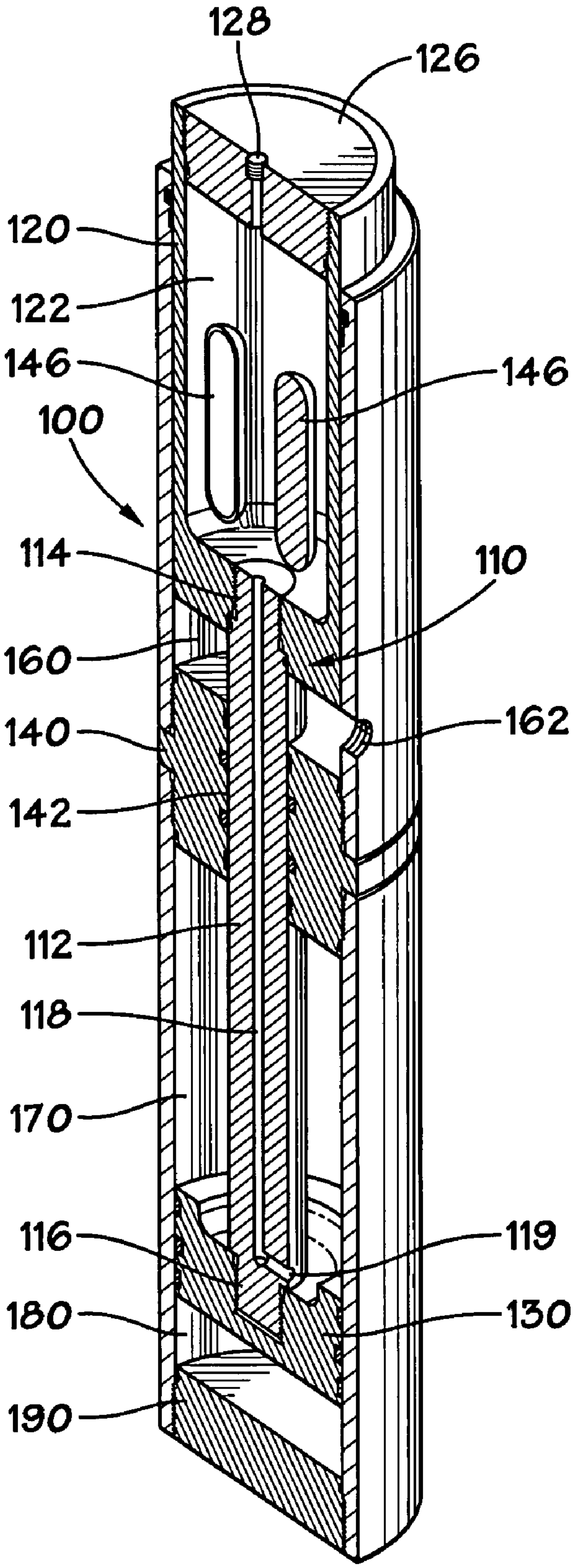
FIG. 5C is a cutaway perspective view of the pressure accumulator of FIG. 5A.

FIGS. 5A, 5B and 5C illustrate a system 100 according to the present invention. FIG. 4 shows schematically the system 100 as used to operate a BOP operator. Fluid from a surface hydraulic power system HP is stored in the system 100 for use through a directional control valve DV to a BOP operator BO. Fluid exhausted from the BOP operator either flows to a vent V or to a fluid recovery system FR for return to the surface. The systems of FIGS. 6, 7A, 8A, 9A and 10A may be used in the scheme shown in FIG. 4 instead of or in addition to a system 100.

The system 100 has an outer housing 102 within which is movably mounted a piston assembly 110 which has a piston rod 112 with a first end 114 and a second end 116. A piston end 120 with an interior cavity 122 is secured to the first end 114 of the rod 112. A piston end 130 is secured to the second end of 116 of the rod 112.

The piston rod 112 moves in a hole 142 in a gland 140 that divides a first chamber 160 (e.g. a chamber for hydraulic fluid) from a second chamber 170 (e.g. a chamber for gas udder pressure, e.g. nitrogen). A third chamber 180 (e.g., a vacuum chamber) is formed between the piston end 130 and an end cap 190. Optionally, these chambers are interchanged with chamber 160 being a vacuum chamber and chamber 180 containing power fluid.

An end cap 126 secured in an opening 124 seals off the interior cavity 122. A valve 128 permits gas under pressure, e.g. nitrogen, to be pumped into and through the cavity 122, through a channel 118 extending through the length of the piston rod 112, out through a channel 119, and into the second chamber 170 to provide pressurized gas force against the piston end 130. A recess 132 is provided in the piston end 130 so that the gas can flow into the second chamber 130. Appropriate seals S1-S6 seal the indicated structural interfaces.

The cavity 122 in the piston end 120 effectively increases the total amount of pressurized gas within the piston assembly 110 by the volume of the cavity 122.

In one embodiment, the end cap 126 and the end surface of the piston end 120 are exposed to the pressure of water, e.g., sea water, when the system 100 is underwater. The force of this water pressure is additive with the force of the pressurized gas in the second chamber 170 and in the interior cavity 122.

Power fluid, e.g. hydraulic fluid, is pumped from the first chamber 160 through a port 162, e.g., to operate a BOP operator on a BOP.

Optionally, one, two, three, four or more (two shown) inserts 146 (solid or hollow, one solid shown, one hollow shown) may be placed within the interior cavity 122 to reduce the effective gas-containing volume of the cavity 122; e.g. to optimize the minimum pressure (in terms of adiabatic discharge).

Figure 6:
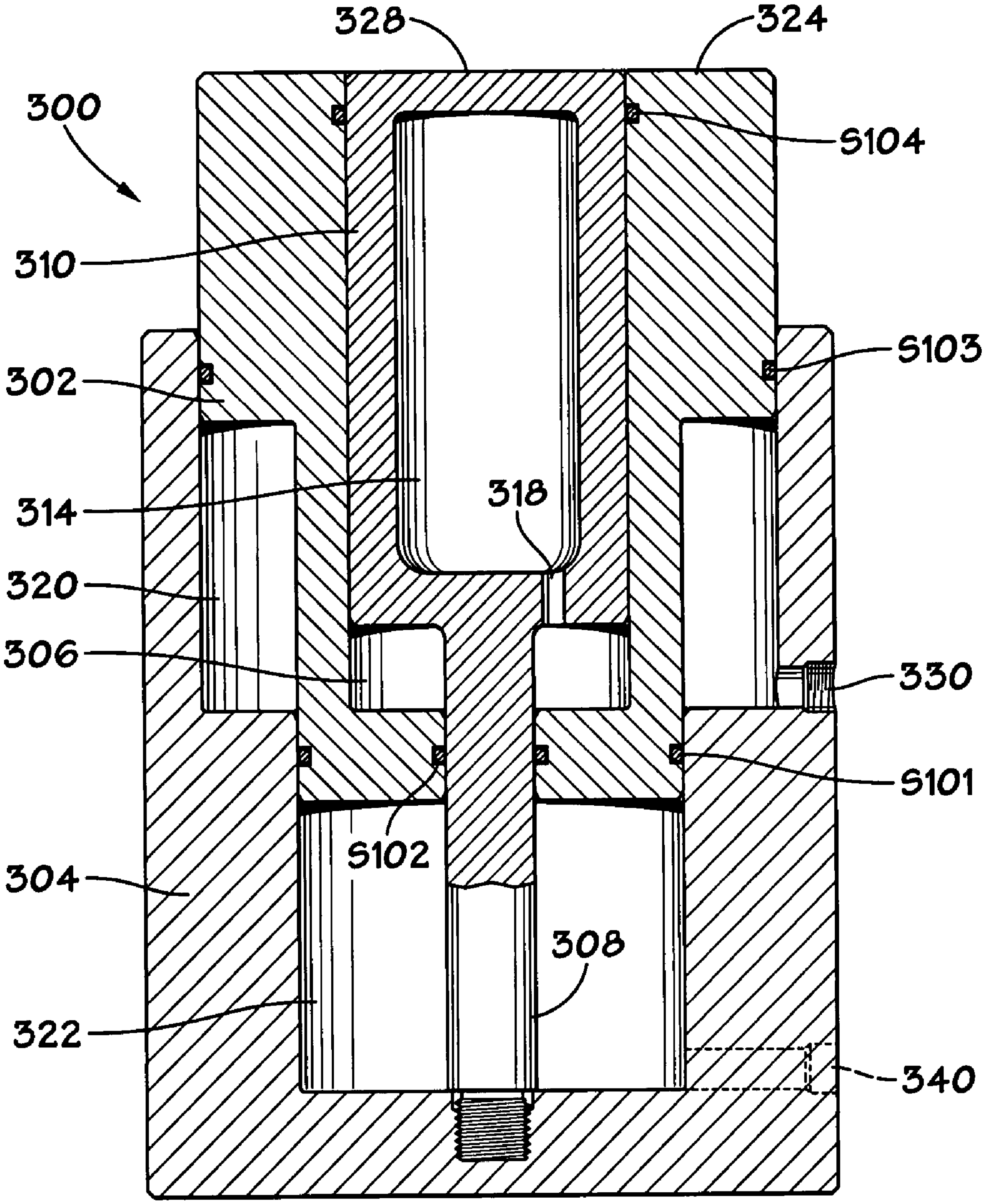
FIG. 6 is a cross-section view of a system according to the present invention.

FIG. 6 illustrates a system 300 according to the present invention which has a movable piston with an inner member with a gas-containing cavity within the piston. This cavity is in fluid communication with a gas-containing chamber so that the effective total volume of gas is increased (as compared to having a gas-containing chamber alone) and, thus, the effective total volume of available gas is increased and, correspondingly, the available volume of power fluid is increased.

A piston 302 movable in a body 304 has an inner chamber 306. An inner member 310 is secured to the body 304 with a beam or rod 308. The inner member 310 is immobile and has a hollow part 312 with an inner cavity 314 that is in fluid communication with the chamber 306 via a channel 318. Both the inner chamber 306 and the cavity 314 can contain gas under pressure. A cavity 322 can be evacuated so that a vacuum (or a very lower pressure is present or, alternatively, it can contain power fluid). A chamber 320 can contain power fluid, e.g. hydraulic fluid (or, alternatively, it can be evacuated so that a vacuum or a very low pressure is present). The pressure of water outside the body 304 can act on an outer surface 324 of the piston 302 and an outer surface 328 of the inner member 310. Appropriate seals S101-S104 seal the indicated interfaces.

As illustrated in FIG. 6, power fluid may exit through a port 330 (like the port 162, FIG. 5A) to a control valve and on to an apparatus to be operated by the fluid. In this embodiment, there is a vacuum or very low pressure in the cavity 322.

Alternatively the power fluid may be in the cavity 322 and exit for use through a port 340 (shown in dotted lines) with a vacuum or very low pressure in the inner chamber 306.

FIGS. 7A-7F illustrate steps in a method of operation of a system like that of FIG. 5A according to the present invention.

Figure 7A:
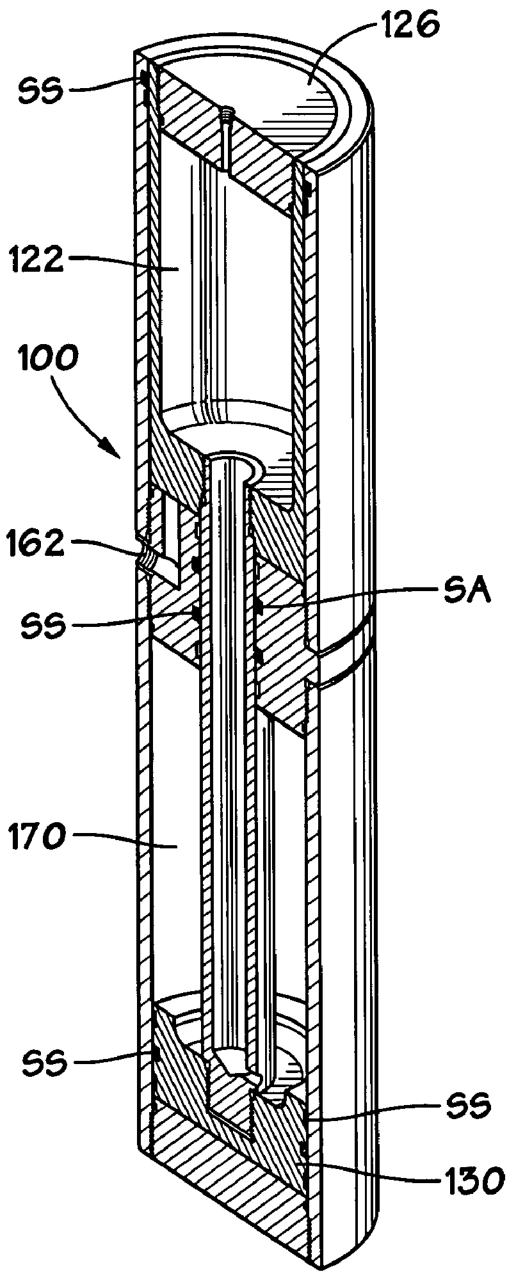
FIG. 7A is a perspective cross-section view of a system according to the present invention as in FIG. 5A.
Figure 7B:
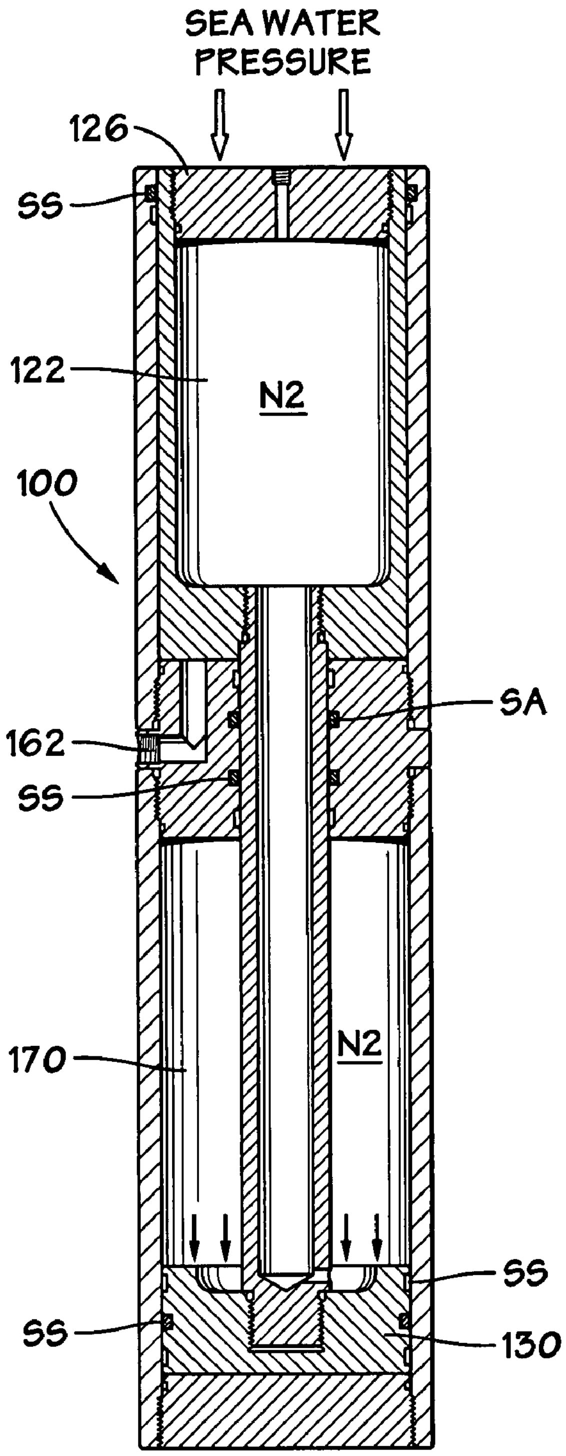
FIG. 7B is a front view of the system as shown in FIG. 7A showing a step in a method according to the present invention.
Figure 7C:
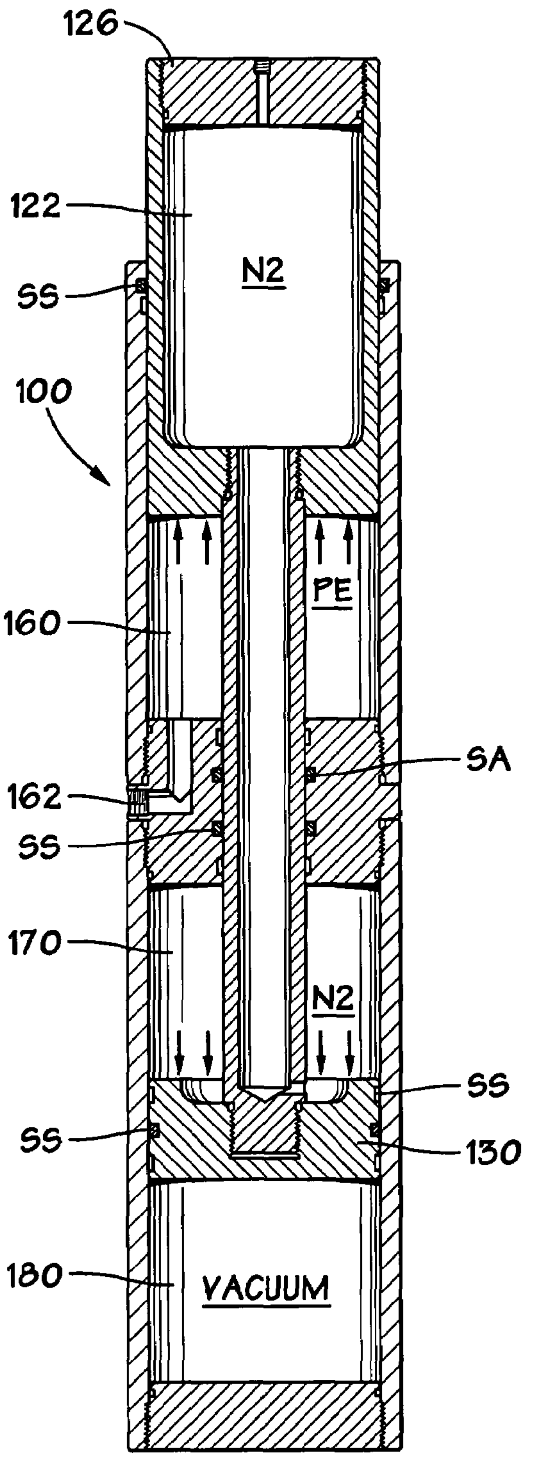
FIG. 7C is a front view of the system of FIG. 7B showing a step in a method of operation of the system.

In FIG. 7A and 7B, no hydraulic power fluid has yet entered the system. The pressure of the seawater is applied to a piston top 126 of a piston assembly (that includes items 130, 142, 120 and 126) and the pressure of gas in chambers 122 and 170 (in this case, nitrogen, "N2") is applied to the piston end 130. As shown in FIG. 7C, fluid PE from a surface hydraulic power unit flows from the port 162 into the chamber 160 moving the piston assembly and compressing the gas in the chambers 122 and 170. This hydraulic power fluid enters the chamber 160 at a pressure sufficient to overcome the pressure of the seawater and the pressure of the gas.

Figure 7D:
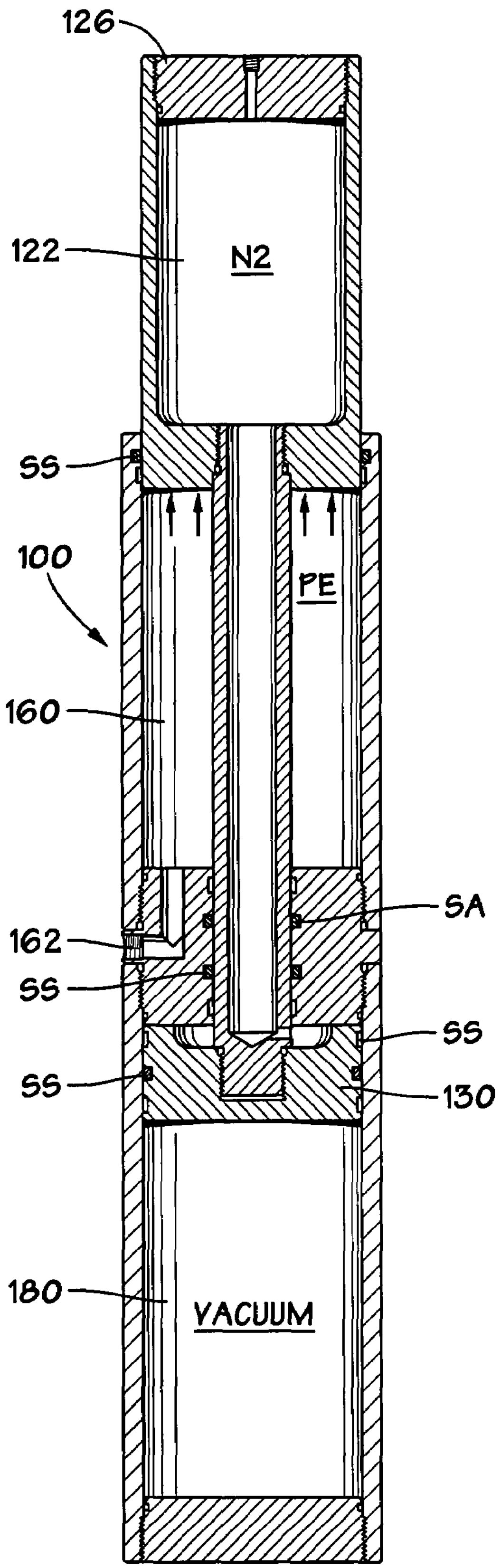
FIG. 7D is a front view of the system of FIG. 7B showing a step in a method of operation of the system.

As shown in FIG. 7D, the piston assembly has moved to the extent of its travel, and the chamber 160 is full of hydraulic fluid and fluid from port 162 ceases. A vacuum (or very low pressure, e.g. 14.7 psi) exists in the chamber 180. In one particular example, the seawater pressure is 5348 psi; the gas pressure is 1272 psi; and the power fluid is at a pressure of 10211 psi. This hydraulic power fluid is now available to be moved from the system to power a device (e.g., but not limited to, a BOP operator).

Figure 7E:
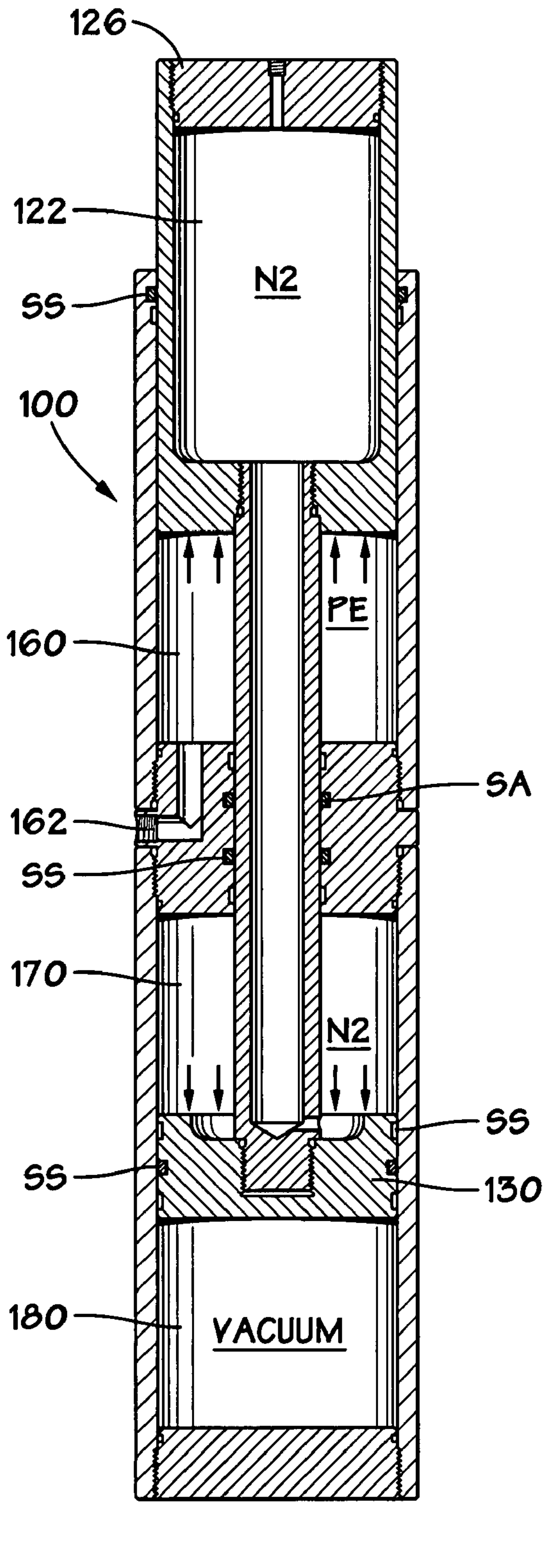
FIG. 7E is a front view of the system of FIG. 7B showing a step in a method of operation of the system.

FIG. 7E illustrates the beginning of the provision of the power fluid from the chamber 160 to an external apparatus or control system. Power fluid flows from the chamber 160 through the port 162. The force of the seawater and of the compressed gas, and the vacuum's force move the power fluid.

Figure 7F:
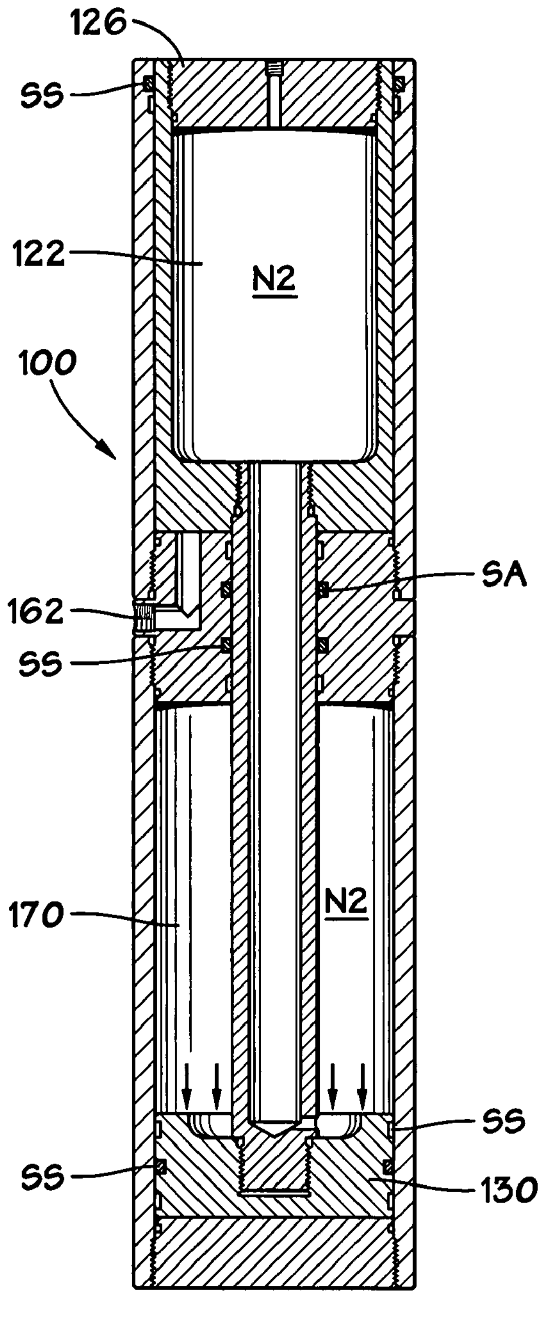
FIG. 7F is a front view of the system of FIG. 7B showing a step in a method of operation of the system.

FIG. 7F illustrates the discharge of the power fluid from the system. The system is now ready to again receive power fluid from the surface.

Figure 8A:
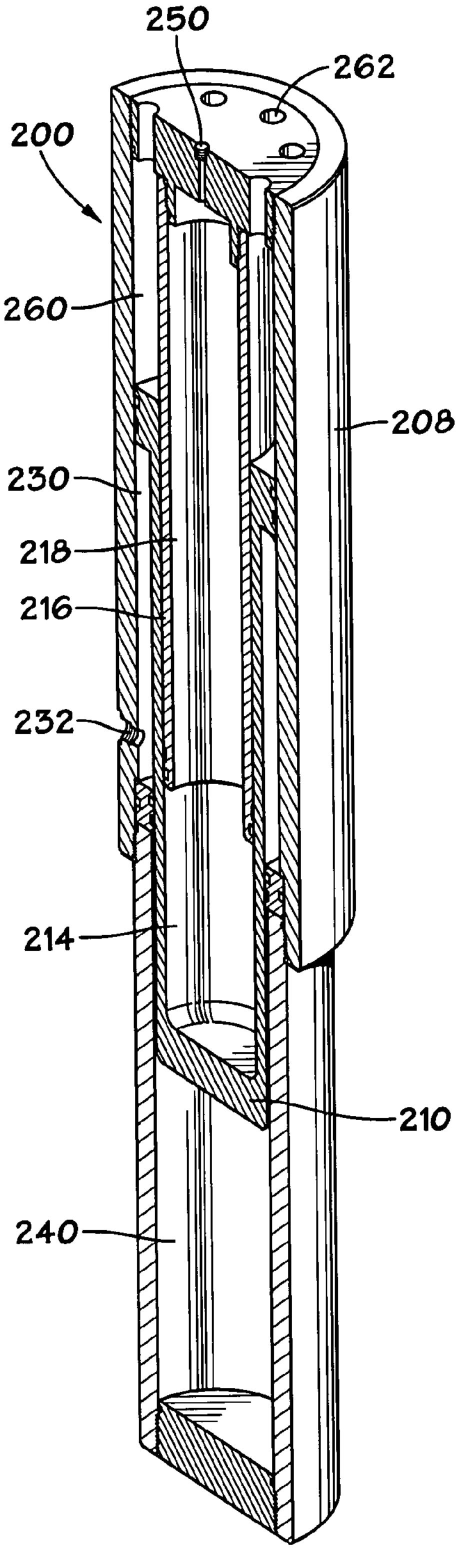
FIG. 8A is a perspective cross-section view of a system according to the present invention.
Figure 8B:
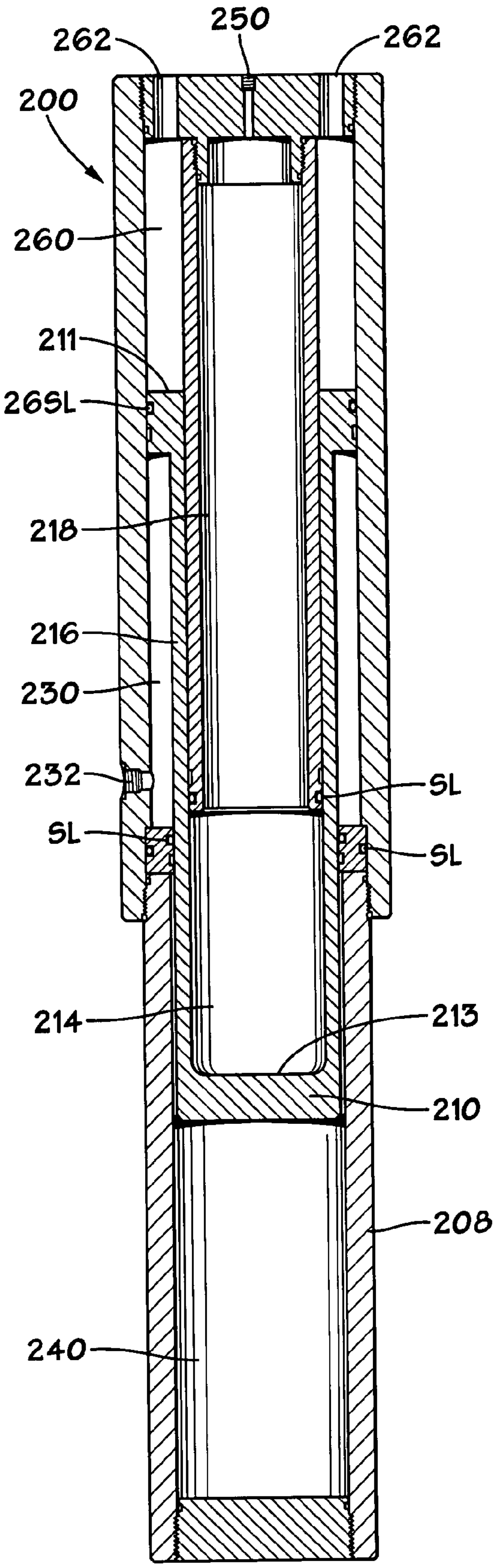
FIG. 8B is a perspective cross-section view of the system of FIG. 8A.

FIGS. 8A and 8B show a system 200 according to the present invention like the systems of FIG. 5A and FIG. 7A, but with an interior chamber for water, e.g. seawater. As with the system shown in FIG. 5A, the system 200 is generally cylindrical, but only half is shown in FIGS. 8A and 8B.

A piston 210, movably positioned on a housing 208, has a gas chamber 214 for gas under pressure. The housing 208 may be two pieces secured together as shown (or a single piece). The piston 210 is mounted around and moves on a piston guide 216 which has an interior chamber 218 for additional gas under pressure. Hydraulic power fluid flows through a port 232 into a power fluid chamber 230 which is defined by part of an interior wall of the housing 208 and part of an exterior wall of the piston 210. An interior vacuum chamber 240 (or chamber of relatively low pressure) is located at one end of the housing 208. The lower end of the chamber 218 of the guide 216 is open to the chamber 214.

Gas under pressure, e.g. nitrogen, is charged into the chambers 214, 218 through a port 250. Water from outside the system 200 flows into a chamber 260 through openings 262. The pressure of the water acts on an end 211 of the piston 210. The gas under pressure in the chambers 214, 218 acts on an end 213 of the piston 210. Seals SL seal various interfaces in the system.

Hydraulic power fluid at a pressure greater than the combined pressure of the gas in chambers 214, 218 and the water in chamber 260 and the force of the vacuum in chamber 240 is introduced through the port 232 into the chamber 230 (e.g. for storage until it is used for a function, e.g. to operate a BOP operator). This moves the piston 210 (upwardly as shown in FIGS. 8A, 8B). With the valve 232 shut, the power fluid remains in the chamber 230. Upon opening of the valve 232 by a control system (not shown), the power fluid flows out from the chamber 230 (due to the vacuum, force of gas, and force of water).

Figure 9A:
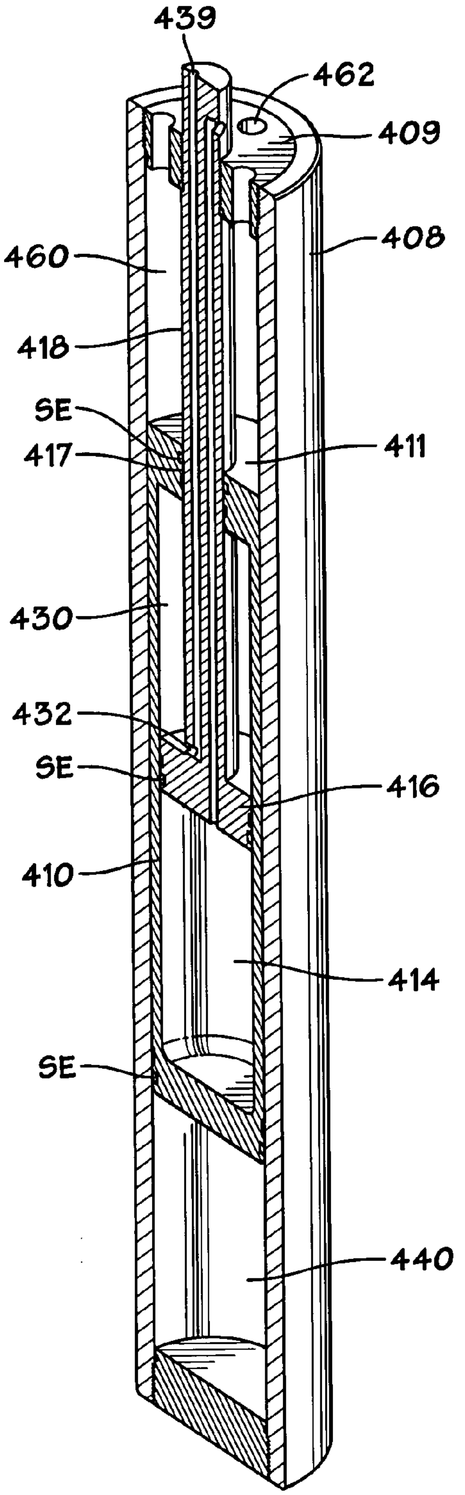
FIG. 9A is a perspective cross-section view of a system according to the present invention.
Figure 9B:
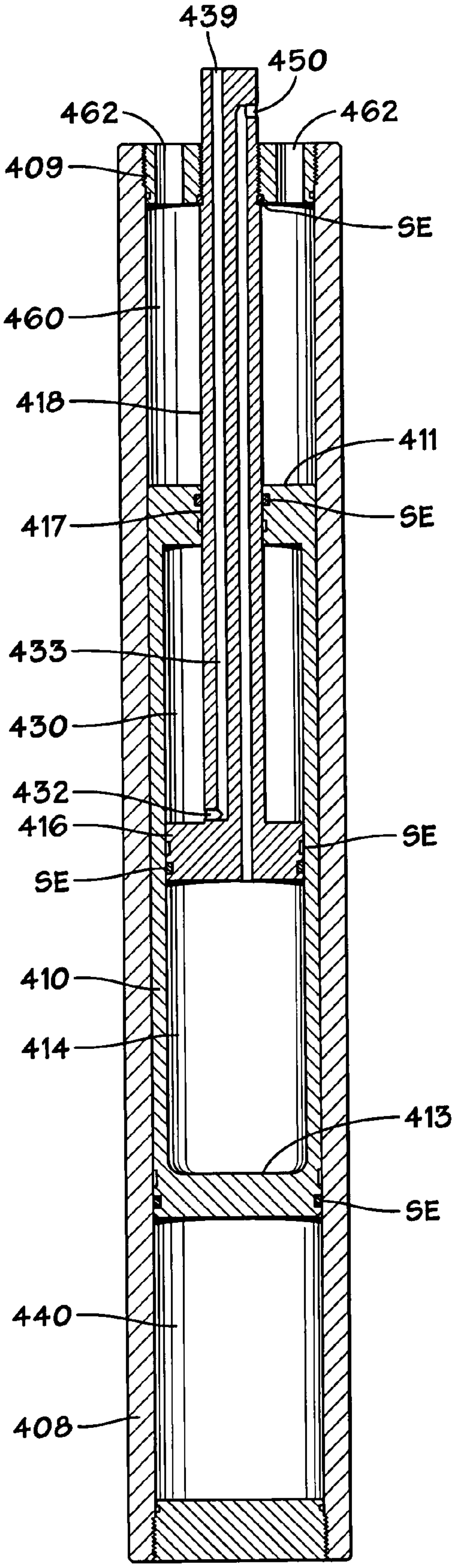
FIG. 9B is a perspective cross-section view of the system of FIG. 9A.

FIGS. 9A and 9B show a system 400 according to the present invention like the systems of FIG. 5A, FIG. 7A, but with an interior chamber for water, e.g. seawater and with a "tub" piston assembly movable within the housing. As with the system shown in FIG. 5A, the system 400 is generally cylindrical, but only half is shown in FIGS. 9A and 9B.

A piston 410, movably positioned in a housing 408, has a gas chamber 414 for gas under pressure. The piston 410 is a "tub" piston with exterior walls and an internal fluid containing space for containing power fluid and gas. The housing 408 may be two pieces secured together, or as shown a single piece. The piston 410 is mounted around and moves on a piston guide 416 and guide rod 418. The guide rod 418 projects through an opening 417 in the piston 410 and through a top plate 409 of the housing 408. Hydraulic power fluid (e.g. from a surface source) flows through a port 439, through a channel 433 and through a port 432 into a power fluid chamber 430 which is defined by part of an interior wall of the piston 410 and part of an exterior wall of the guide rod 418 and top of the piston guide 416. An interior vacuum chamber 440 (or chamber of relatively low pressure) is located at one end of the housing 408.

Gas under pressure, e.g. nitrogen, is charged into the chamber 414 through a port 450. Water from outside the system 400 flows into a chamber 460 through openings 462. The pressure of the water acts on an end 411 of the piston 410. The gas under pressure in the chamber 414 acts on an end 413 of the piston 410. Seals SE seal various interfaces in the system.

Hydraulic power fluid at a pressure greater than the pressure of the gas in chamber 414 and the water in chamber 460 and the force of the vacuum in chamber 440, is introduced through the port 432 into the chamber 430. This moves the piston 410 (upwardly as shown in FIGS. 9A, 9B). With no flow through the port 432, the power fluid remains in the chamber 430 until it is used. Upon fluid flow from the port 432, the power fluid flows out from the chamber 430 (due to the vacuum force, force of gas, and force of water). The systems 200, 300 and 400 provide the water "boost" feature discussed above.

Figure 10A:
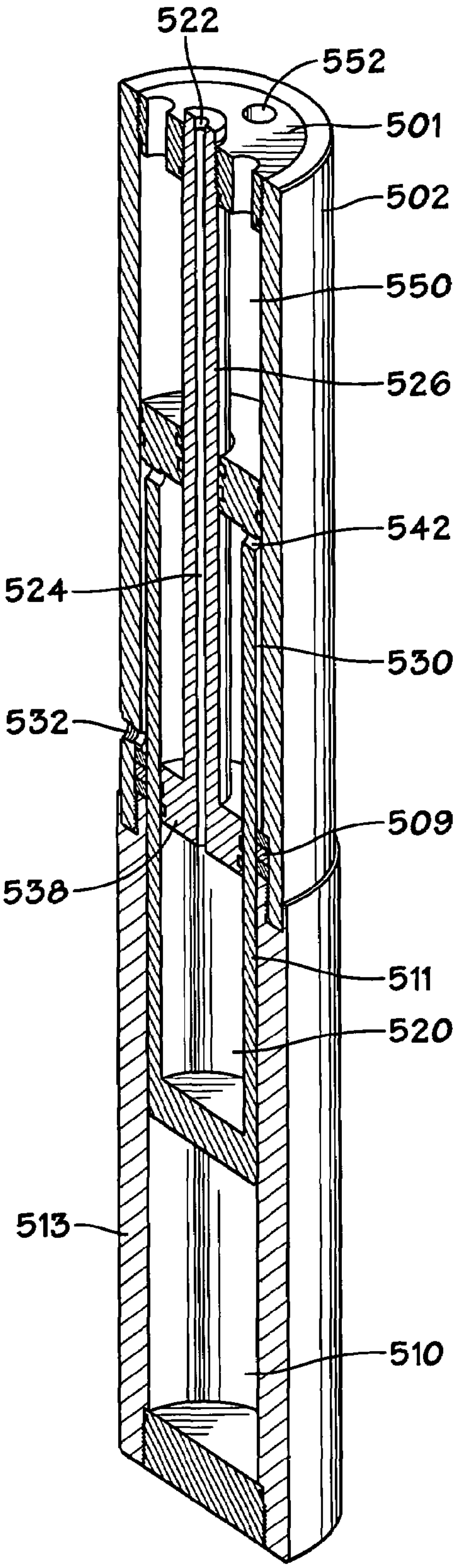
FIG. 10A is a perspective cross-section view of a system according to the present invention.
Figure 10B:
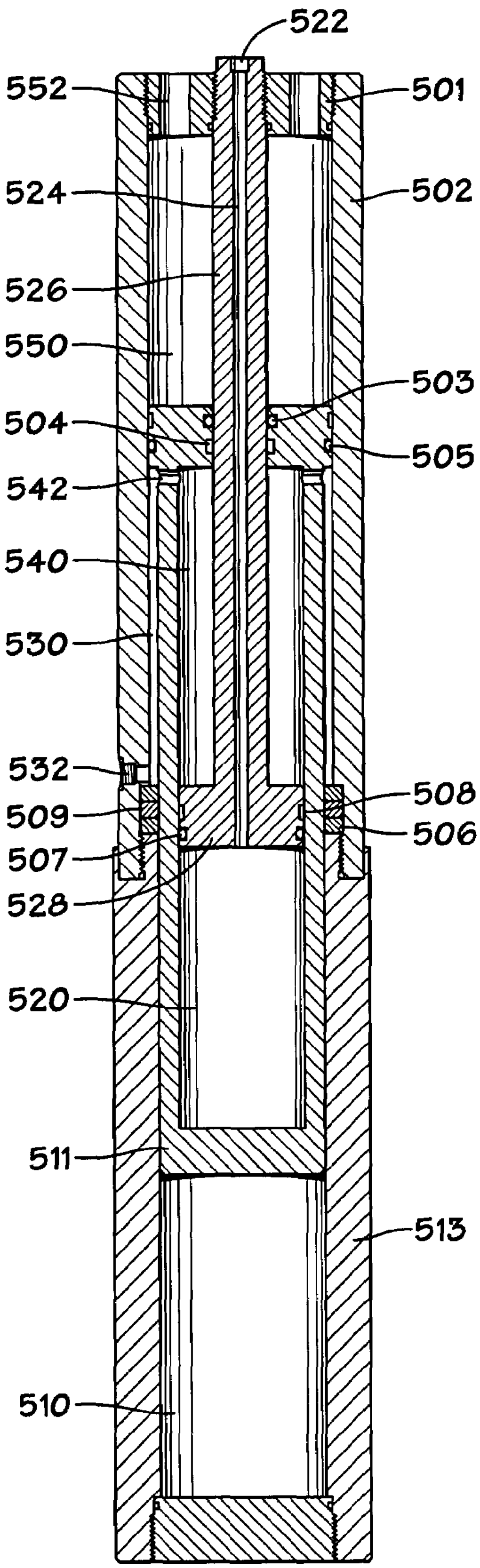
FIG. 10B is a perspective cross-section view of the system of FIG. 10A.

FIGS. 10 and 10B show a system 500 according to the present invention which has five interior chambers 510, 520, 530, 540 and 550. The system 500 is generally cylindrical, but only half is shown in FIG. 10A. The chamber 510 is a vacuum chamber (or chamber of very low pressure). The chamber 520 contains gas under pressure, e.g. nitrogen. The chambers 530 and 540 contain power fluid. The chamber 550 contains water, e.g. sea water.

Water enters the chamber 550 through holes 552 in a top plate 501 of a first housing 502. Power fluid enters the chamber 530 through a port 532 and flows into the chamber 540 through a port 542. Gas flows through a port 522 and through a channel 524 in a rod 526 to the chamber 520. Seals 503-509 seal the interfaces where they are located.

The rod 526 is connected to or formed integrally with an end 528. Part of the rod 526 and the end 528 are within a hollow member 511 in which are the chambers 520 and 540 (which, like other chambers in other embodiments herein, vary in volume depending on the position of other elements). The hollow member 511 is movable within a first housing 502 and a second housing 513.

Connected to the first housing 502, the second housing 513 contains part of the movable member 511 is in the second housing 513. The seal 505 prevents water from impacting the exterior of the member 511 around the chamber 520 and thus the chamber 520 is always maintained with a positive internal pressure. The chamber 510 has a negative internal pressure. For this reason, the wall thickness of the second housing is relatively thicker than the wall thickness of the first housing. The first housing 502 includes the chambers 530, 540, and 550 in all of which a positive internal pressure is maintained. Adding the chamber 530 results in a relatively larger volume of available power fluid (as compared to a system in which there is no chamber 530) and which provides the correct piston surface area ratios for operation.

The present invention, therefore, in at least some, but not necessarily all embodiments, provides an accumulator system, the accumulator system for subwater use, the accumulator system including: a body; a fluid chamber within the body for selectively containing power fluid; a piston assembly movably disposed within the body; a gas chamber within the body for containing gas under pressure to move the piston assembly to move the power fluid out of the fluid chamber of the body; the piston assembly including a cavity therein for containing gas under pressure for assisting in movement of the piston assembly; and the cavity in fluid communication with the gas chamber. Such a system may have one or some (in any possible combination) of the following: the piston assembly having a first piston end exposed exteriorly of the body for action thereupon of water pressure of water exterior to the body, said water pressure assisting in movement of the piston assembly to move power fluid from the fluid chamber out of the body; at least one insert removably located within the cavity for reducing the gas-containing capacity of the cavity; an apparatus to be operated by the power fluid, the fluid chamber having an exit port in fluid communication with the apparatus to be operated by the power fluid moved from the fluid chamber; the apparatus to be operated by the power fluid being a blowout preventer operator; the accumulator system located beneath water, a surface hydraulic power system at a surface above the water, the surface hydraulic power system for providing the power fluid to the fluid chamber of the body; the accumulator system located beneath water, a surface hydraulic power system at a surface above the water, the surface hydraulic power system for providing the power fluid to the fluid chamber of the body, and valve apparatus for controlling flow of power fluid to the apparatus from the surface hydraulic power system and for directing power fluid exhausted from the apparatus to a chosen line; the chosen line including any of a vent line or a line to a fluid recovery system; and/or a body having three interior chambers, including the fluid chamber, the gas chamber, and a third chamber, the body having a first body end with a first opening in the body, and a second body end with a second opening in the body, an amount of operational power fluid in the fluid chamber, an amount of pressurized gas in the gas chamber, a lower pressure in the third chamber, the piston assembly movably and sealingly mounted within the body, in the piston assembly a first piston end closing off the first opening and preventing hydraulic fluid from exiting through the first opening from the first chamber, the first piston end having an outer surface and an inner surface, the operational power fluid applying a first pressure against the first piston end's inner surface, water exterior to the accumulator system above to contact and to apply pressure to the outer surface of the first piston end to move the piston assembly in a direction toward the second body end, a piston rod with a first rod end and a second rod end, the first rod end connected to the first piston end, the second rod end connected to the second piston end, the piston assembly having a second piston end movably located in the second chamber, the second rod end connected to the second piston end, gas in the second chamber able to act on the second piston end to move the piston assembly in a direction away from the first opening, a channel through the piston rod and in fluid communication with the cavity and with the second chamber so that the gas within the cavity is flowable into the second chamber.

The present invention, therefore, in at least some, but not necessarily all embodiments, provides an accumulator system, the accumulator system for subwater use, the accumulator system including: a body; a fluid chamber within the body for selectively containing power fluid; a piston assembly movably disposed within the body; a gas chamber within the body for containing gas under pressure to move the piston assembly to move the power fluid out of the fluid chamber of the body; the piston assembly including a first piston end with a cavity therein for containing gas under pressure for assisting in movement of the piston assembly; the cavity in fluid communication with the gas chamber; the first piston end exposed exteriorly of the body for action thereupon of water pressure of water exterior to the body, said water pressure assisting in movement of the piston assembly to move power fluid from the fluid chamber out of the body; an apparatus to be operated by the power fluid; the fluid chamber having an exit port in fluid communication with the apparatus to be operated by the power fluid moved from the fluid chamber; the accumulator system located beneath water; a surface hydraulic power system at a surface above the water, the surface hydraulic power system for providing the power fluid to the fluid chamber of the body; the accumulator system located beneath water; a surface hydraulic power system at a surface above the water, the surface hydraulic power system for providing the power fluid to the fluid chamber of the body; valve apparatus for controlling flow of power fluid to the apparatus from the surface hydraulic power system and for directing power fluid exhausted from the apparatus to a chosen line; and wherein the chosen line can include any of a vent line or a line to a fluid recovery system.

The present invention, therefore, in at least some, but not necessarily all embodiments, provides a method for operating an apparatus located beneath water with power fluid, the method including storing power fluid in an accumulator system, the accumulator system as any according to the present invention, moving a piston assembly of the accumulator system to move power fluid out of a fluid chamber and to an apparatus, and powering the apparatus with the power fluid. Such a system may have one or some (in any possible combination) of the following: wherein the apparatus to be operated by the power fluid is a blowout preventer operator, the method including: operating the blowout preventer operator with the power fluid; wherein the accumulator system is located beneath water, a surface hydraulic power system at a surface above the water, the surface hydraulic power system for providing the power fluid to the fluid chamber of the body, the method including providing power fluid to the fluid chamber of the accumulator system; wherein the accumulator system includes valve apparatus for controlling flow of power fluid to the apparatus from the surface hydraulic power system and for directing power fluid exhausted from the apparatus to a chosen line, the method including controlling with the valve apparatus flow of power fluid to the apparatus; and/or wherein the chosen line can include any of a vent line or a line to a fluid recovery system, the method including: directing with the valve apparatus power fluid exhausted from the apparatus to any of a vent line or a fluid recovery system.

The present invention, therefore, in at least some, but not necessarily all embodiments, provides an accumulator system, the accumulator system for subwater use, the accumulator system including: a body; a piston assembly movably disposed within the body, the piston assembly having an interior; a rod member passing through the body and extending into the interior of the piston assembly; a rod member end on an end of the rod member, the rod member end disposed within the interior of the piston assembly, the rod member end having a first side and a second side; power fluid chamber in the interior of the piston assembly, the power fluid chamber adjacent the first side of the rod member; a gas chamber in the interior of the piston assembly, the gas chamber adjacent the second side of the rod member; and the piston assembly movable by gas in the chamber to move power fluid out of the power fluid chamber. Such a system may have one or some (in any possible combination) of the following: a low pressure chamber within the body and outside of the piston assembly, low pressure (e.g. but not limited to, a vacuum) within the low pressure chamber for assisting in moving power fluid from the power fluid chamber; a water chamber within the body and outside the piston assembly for receiving water from outside the body, pressure of said water for assisting in moving the piston assembly to move power fluid from the power fluid chamber; an apparatus to be operated by the power fluid; the power fluid chamber having an exit port in fluid communication with the apparatus to be operated by the power fluid moved from the fluid chamber; and/or wherein the apparatus to be operated by the power fluid is a blowout preventer operator.

Accordingly, while preferred embodiments of this invention have been shown and described, many variations, modifications and/or changes of the system, apparatus and methods of the present invention, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and not limiting, and the scope of the invention and the appended claims is not limited to the embodiments described and shown herein.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes.

What is claimed is:

1. An accumulator system, the accumulator system for subwater use, the accumulator system comprising a body, a piston assembly movably disposed within the body, the piston assembly having an interior, a rod member passing through the body and extending into the interior of the piston assembly, a rod member end on an end of the rod member, the rod member end disposed within the interior of the piston assembly, the rod member end having a first side and a second side, a power fluid chamber in the interior of the piston assembly, the power fluid chamber adjacent the first side of the rod member, a gas chamber in the interior of the piston assembly, the gas chamber adjacent the second side of the rod member, and the piston assembly movable by gas in the chamber to move power fluid out of the power fluid chamber.

2. The accumulator system of claim 1 further comprising a low pressure chamber within the body and outside of the piston assembly, low pressure within the low pressure chamber for assisting in moving power fluid from the power fluid chamber.

3. The accumulator system of claim 1 further comprising a water chamber within the body and outside the piston assembly for receiving water from outside the body, pressure of said water for assisting in moving the piston assembly to move power fluid from the power fluid chamber.

4. The accumulator system of claim 1 further comprising an apparatus to be operated by the power fluid, the power fluid chamber having an exit port in fluid communication with the apparatus to be operated by the power fluid moved from the fluid chamber.

5. The accumulator system of claim 4 wherein the apparatus to be operated by the power fluid is a blowout preventer operator.

6. An accumulator system, the accumulator system for subwater use, the accumulator system comprising a body, a fluid chamber within the body for selectively containing power fluid, a piston assembly movably disposed within the body, a gas chamber within the body for containing gas under pressure to move the piston assembly to move the power fluid out of the fluid chamber of the body, the piston assembly including a cavity therein for containing gas under pressure for assisting in movement of the piston assembly, the cavity in fluid communication with the gas chamber, and at least one insert removably located within the cavity for reducing the gas-containing capacity of the cavity.

7. An accumulator system, the accumulator system for subwater use, the accumulator system comprising a body, a fluid chamber within the body for selectively containing power fluid, a piston assembly movably disposed within the body, a gas chamber within the body for containing gas under pressure to move the piston assembly to move the power fluid out of the fluid chamber of the body, the piston assembly including a cavity therein for containing gas under pressure for assisting in movement of the piston assembly, the cavity in fluid communication with the gas chamber, the body having a third chamber, the body having a first body end with a first opening in the body, and a second body end with a second opening in the body, an amount of operational power fluid in the fluid chamber, an amount of pressurized gas in the gas chamber, a lower pressure in the third chamber, the piston assembly movably and sealingly mounted within the body, in the piston assembly a first piston end closing off the first opening and preventing hydraulic fluid from exiting through the first opening from the first chamber, the first piston end having an outer surface and an inner surface, the operational power fluid applying a first pressure against the first piston end's inner surface, water exterior to the accumulator system to contact and to apply pressure to the outer surface of the first piston end to move the piston assembly in a direction toward the second body end, a piston rod with a first rod end and a second rod end, the first rod end connected to the first piston end, the second rod end connected to the second piston end, the piston assembly having a second piston end movably located in the second chamber, the second rod end connected to the second piston end, gas in the second chamber able to act on the second piston end to move the piston assembly in a direction away from the first opening, and a channel through the piston rod and in fluid communication with the cavity and with the second chamber so that the gas within the cavity is flowable into the second chamber.

8. The accumulator system of claim 7 further comprising at least one insert removably located within the cavity for reducing the gas-containing capacity of the cavity.

9. The accumulator system of claim 7 further comprising an apparatus to be operated by the power fluid, and the fluid chamber having an exit port in fluid communication with the apparatus to be operated by the power fluid moved from the fluid chamber.

10. The accumulator system of claim 9 wherein the apparatus to be operated by the power fluid is a blowout preventer operator.

11. The accumulator system of claim 7 further comprising the accumulator system located beneath water, and a surface hydraulic power system at a surface above the water, the surface hydraulic power system for providing the power fluid to the fluid chamber of the body.

12. The accumulator system of claim 7 further comprising the accumulator system located beneath water and for operating an apparatus in the water, a surface hydraulic power system at a surface above the water, the surface hydraulic power system for providing the power fluid to the fluid chamber of the body, and valve apparatus for controlling flow of power fluid to the apparatus from the surface hydraulic power system and for directing power fluid exhausted from the apparatus to a chosen line.

13. The accumulator system of claim 12 wherein the chosen line can include any of a vent line or a line to a fluid recovery system.

14. A method for operating an apparatus located beneath water with power fluid, the method comprising storing power fluid in an accumulator system, the accumulator system comprising a body, a piston assembly movably disposed within the body, the piston assembly having an interior, a rod member passing through the body and extending into the interior of the piston assembly, a rod member end on an end of the rod member, the rod member end disposed within the interior of the piston assembly, the rod member end having a first side and a second side, a power fluid chamber in the interior of the piston assembly, the power fluid chamber adjacent the first side of the rod member, a gas chamber in the interior of the piston assembly, the gas chamber adjacent the second side of the rod member, and the piston assembly movable by gas in the chamber to move power fluid out of the power fluid chamber, moving the piston assembly to move the power fluid out of the fluid chamber and to the apparatus, and powering the apparatus with the power fluid.

15. The method of claim 14 wherein the apparatus to be operated by the power fluid is a blowout preventer operator, the method further comprising operating the blowout preventer operator with the power fluid.

16. The method of claim 14 wherein the accumulator system is located beneath water, a surface hydraulic power system at a surface above the water, the surface hydraulic power system for providing the power fluid to the fluid chamber of the body, the method further comprising providing power fluid to the fluid chamber of the accumulator system.

17. The method of claim 16 wherein the accumulator system includes valve apparatus for controlling flow of power fluid to the apparatus from the surface hydraulic power system and for directing power fluid exhausted from the apparatus to a chosen line, the method further comprising controlling with the valve apparatus flow of power fluid to the apparatus.

18. The method of claim 17 wherein the chosen line can include any of a vent line or a line to a fluid recovery system, the method further comprising directing with the valve apparatus power fluid exhausted from the apparatus to any of a vent line or a fluid recovery system.

19. The method of claim 14 wherein the accumulator system further comprises a low pressure chamber within the body and outside of the piston assembly, low pressure within the low pressure chamber for assisting in moving power fluid from the power fluid chamber.

20. The method of claim 14 wherein the accumulator system further comprises a water chamber within the body and outside the piston assembly for receiving water from outside the body, pressure of said water for assisting in moving the piston assembly to move power fluid from the power fluid chamber.

21. The method of claim 14 wherein the accumulator system further comprises the power fluid chamber having an exit port in fluid communication with the apparatus to be operated by the the power fluid moved from the power fluid chamber.

* * * * *